US012717918B2

(12) United States Patent
Seto

(10) Patent No.: US 12,717,918 B2

(45) Date of Patent: Aug. 25, 2026

(54) IMAGE FORMING APPARATUS AND CONTROL METHOD

(71) Applicant: SHARP KABUSHIKI KAISHA, Sakai City (JP)

(72) Inventor: Hideki Seto, Sakai City (JP)

(73) Assignee: SHARP KABUSHIKI KAISHA, Sakai City (JP)

( * ) Notice: Subject to any disclaimer, the term of this patent is extended or adjusted under 35 U.S.C. 154(b) by 156 days.

(21) Appl. No.: 18/207,046

(22) Filed: Jun. 7, 2023

(65) Prior Publication Data

US 2023/0401315 A1 Dec. 14, 2023

(30) Foreign Application Priority Data

Jun. 13, 2022 (JP) ................................ 2022-095189

(51) Int. Cl.

*G06F 21/56* (2013.01)
*G06F 8/61* (2018.01)
*G06F 21/60* (2013.01)

(52) U.S. Cl.

CPC .............. *G06F 21/566* (2013.01); *G06F 8/61* (2013.01); *G06F 21/608* (2013.01)

(58) Field of Classification Search

CPC .... G06F 21/566; G06F 21/568; G06F 21/608; G06F 8/06

See application file for complete search history.

(56) References Cited

U.S. PATENT DOCUMENTS

| | | | | |
|---|---|---|---|---|
| 8,248,634 | B2 | 8/2012 | Ishida et al. | |
| 2005/0177748 | A1* | 8/2005 | Katano | G06F 21/56 726/5 |
| 2011/0032567 | A1 | 2/2011 | Ishida et al. | |
| 2013/0194630 | A1* | 8/2013 | Kishimoto | G06F 3/1285 358/1.15 |
| 2014/0047504 | A1* | 2/2014 | Tsuchitoi | H04L 63/20 726/1 |
| 2020/0012529 | A1* | 1/2020 | Jimbo | H04N 1/00477 |
| 2020/0034555 | A1* | 1/2020 | Ohno | H04L 63/145 |
| 2020/0151333 | A1* | 5/2020 | Tomiyasu | G06F 3/1239 |
| 2023/0117536 | A1* | 4/2023 | Sugiura | G06F 3/1236 358/1.15 |

FOREIGN PATENT DOCUMENTS

| | | | | |
|---|---|---|---|---|
| JP | 2011-039599 | A | | 2/2011 |
| JP | 2019168764 | A | * | 10/2019 |
| JP | 2020-017818 | A | | 1/2020 |
| JP | 2020-191613 | A | | 11/2020 |
| JP | 2021018594 | A | * | 2/2021 |

* cited by examiner

*Primary Examiner* — Trong H Nguyen

(74) *Attorney, Agent, or Firm* — ScienBiziP, P.C.

(57) ABSTRACT

An image forming apparatus includes a setting unit that performs setting of a system, an image formation section that forms an image according to the setting, and a processing unit that performs a process for a quarantine against a virus. The setting unit performs setting concerning security. The processing unit implements the quarantine against a virus if the setting concerning security has been changed.

15 Claims, 14 Drawing Sheets

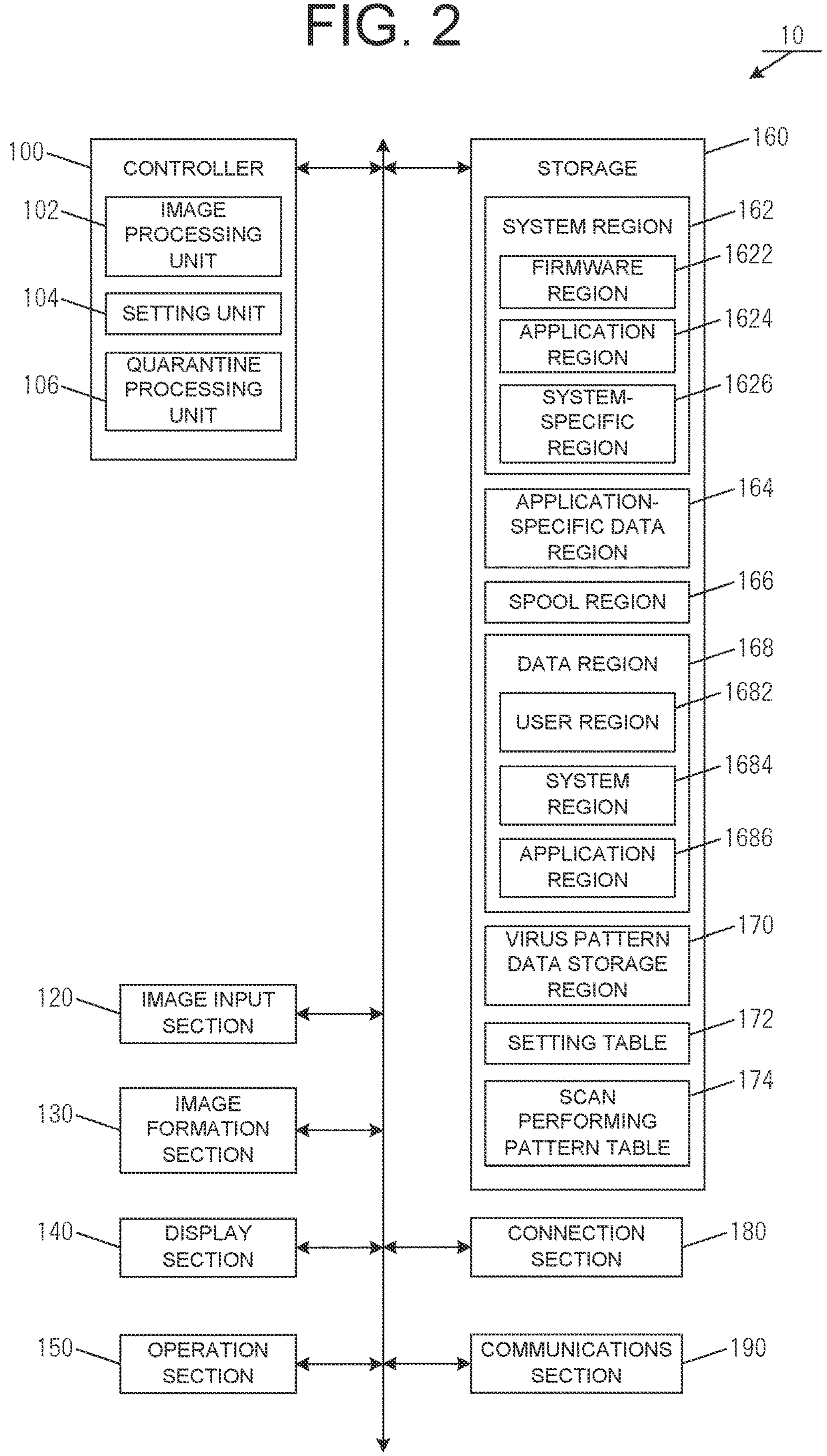

FIG. 2
10
100
CONTROLLER
102
IMAGE PROCESSING UNIT
104
SETTING UNIT
106
QUARANTINE PROCESSING UNIT
160
STORAGE
162
SYSTEM REGION
1622
FIRMWARE REGION
1624
APPLICATION REGION
1626
SYSTEM-SPECIFIC REGION
164
APPLICATION-SPECIFIC DATA REGION
166
SPOOL REGION
168
DATA REGION
1682
USER REGION
1684
SYSTEM REGION
1686
APPLICATION REGION
170
VIRUS PATTERN DATA STORAGE REGION
172
SETTING TABLE
174
SCAN PERFORMING PATTERN TABLE
120
IMAGE INPUT SECTION
130
IMAGE FORMATION SECTION
140
DISPLAY SECTION
150
OPERATION SECTION
180
CONNECTION SECTION
190
COMMUNICATIONS SECTION

FIG. 3

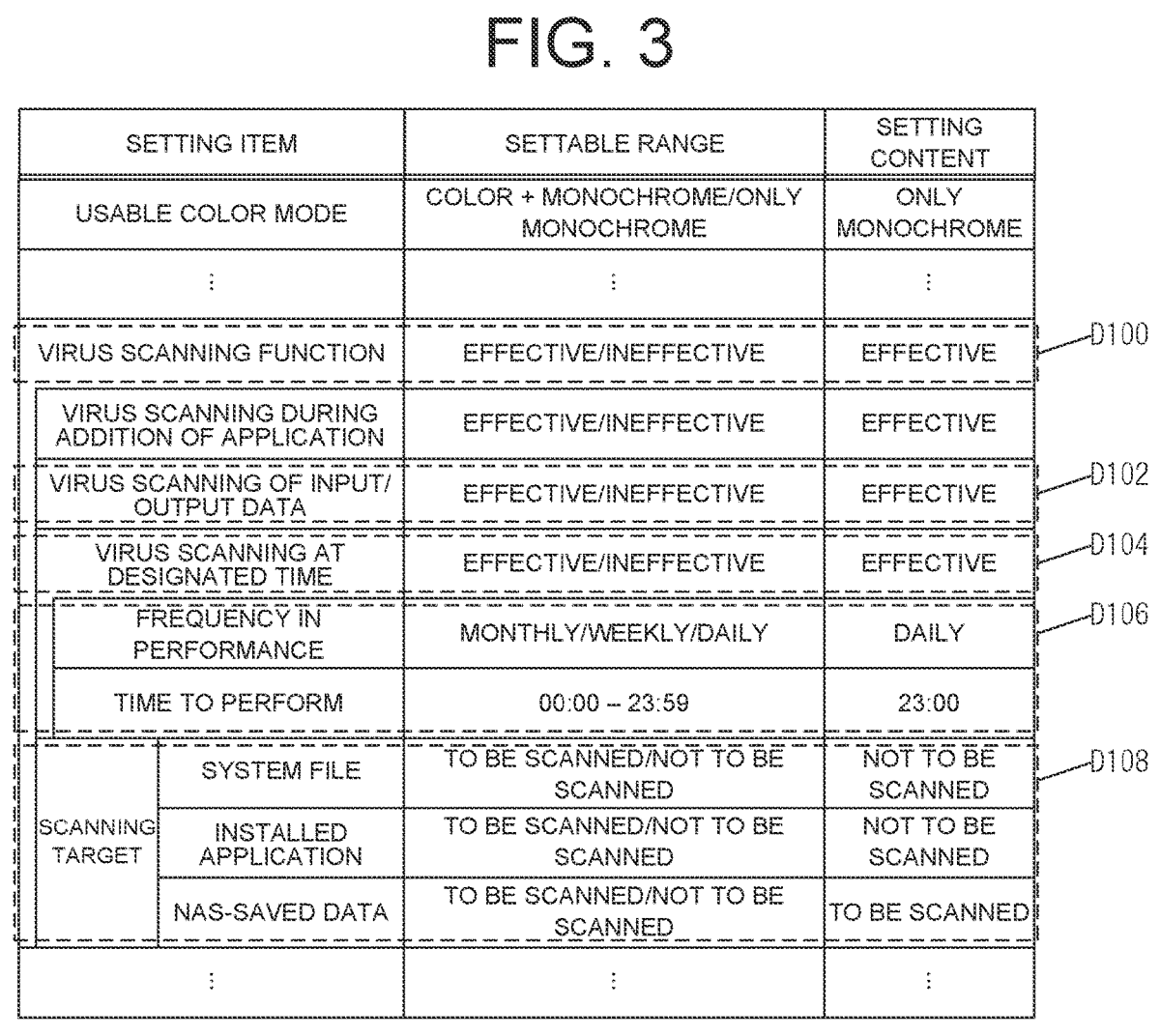

| SETTING ITEM | | SETTABLE RANGE | SETTING CONTENT | |
|---|---|---|---|---|
| USABLE COLOR MODE | | COLOR + MONOCHROME/ONLY MONOCHROME | ONLY MONOCHROME | |
| ⋮ | | ⋮ | ⋮ | |
| VIRUS SCANNING FUNCTION | | EFFECTIVE/INEFFECTIVE | EFFECTIVE | D100 |
| VIRUS SCANNING DURING ADDITION OF APPLICATION | | EFFECTIVE/INEFFECTIVE | EFFECTIVE | |
| VIRUS SCANNING OF INPUT/OUTPUT DATA | | EFFECTIVE/INEFFECTIVE | EFFECTIVE | D102 |
| VIRUS SCANNING AT DESIGNATED TIME | | EFFECTIVE/INEFFECTIVE | EFFECTIVE | D104 |
| FREQUENCY IN PERFORMANCE | | MONTHLY/WEEKLY/DAILY | DAILY | D106 |
| TIME TO PERFORM | | 00:00 – 23:59 | 23:00 | |
| SCANNING TARGET | SYSTEM FILE | TO BE SCANNED/NOT TO BE SCANNED | NOT TO BE SCANNED | D108 |
| | INSTALLED APPLICATION | TO BE SCANNED/NOT TO BE SCANNED | NOT TO BE SCANNED | |
| | NAS-SAVED DATA | TO BE SCANNED/NOT TO BE SCANNED | TO BE SCANNED | |
| ⋮ | | ⋮ | ⋮ | |

FIG. 4

| CLASSIFICATION OF CONDITION | CONDITION OF COMPOUND MACHINE | VIRUS SCANNING RANGE |
|---|---|---|
| MATERIAL CHANGE RELATED TO SECURITY HAS BEEN MADE | VIRUS SCANNING FUNCTION HAS BEEN CHANGED FROM “INEFFECTIVE” TO “EFFECTIVE” | ALL REGIONS |
| CHANGE RELATED TO SECURITY HAS BEEN MADE | SETTING OF HTTPS/FTPS HAS BEEN CHANGED DURING SETTING OF SSL | SPOOL REGION DATA REGION |
| | SETTING OF SMPT-SSL HAS BEEN CHANGED | SYSTEM REGION |
| | SETTING OF LDAP-SSL HAS BEEN CHANGED | SYSTEM REGION |
| | SETTING OF SYSLOG-SSL HAS BEEN CHANGED | SYSTEM REGION |
| ⋮ | ⋮ | ⋮ |

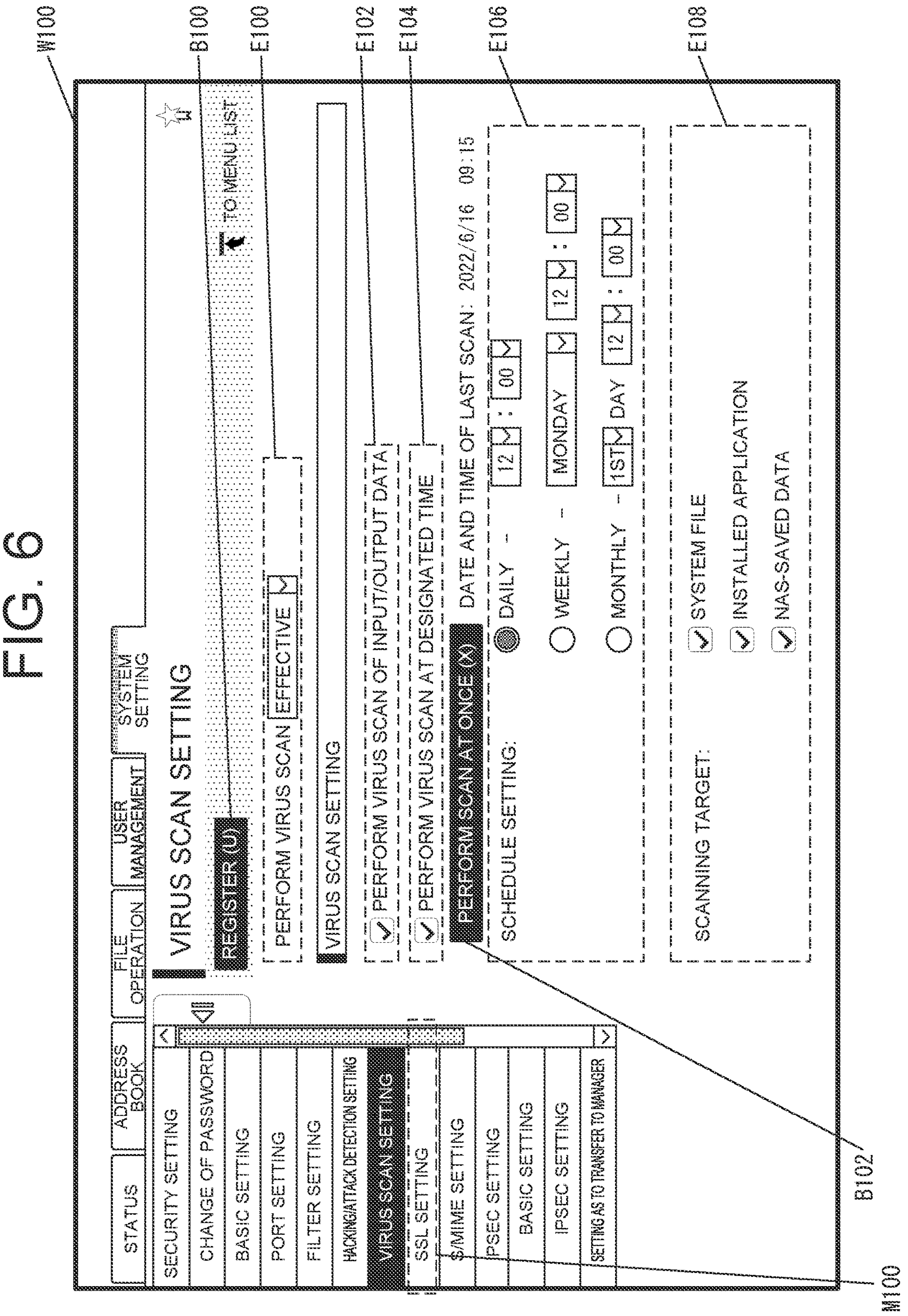

FIG. 6
W100
STATUS
ADDRESS BOOK
FILE OPERATION
USER MANAGEMENT
SYSTEM SETTING
SECURITY SETTING
CHANGE OF PASSWORD
BASIC SETTING
PORT SETTING
FILTER SETTING
HACKING/ATTACK DETECTION SETTING
VIRUS SCAN SETTING
SSL SETTING
S/MIME SETTING
IPSEC SETTING
BASIC SETTING
IPSEC SETTING
SETTING AS TO TRANSFER TO MANAGER
VIRUS SCAN SETTING
REGISTER (U)
TO MENU LIST
B100
PERFORM VIRUS SCAN
EFFECTIVE
E100
VIRUS SCAN SETTING
PERFORM VIRUS SCAN OF INPUT/OUTPUT DATA
E102
PERFORM VIRUS SCAN AT DESIGNATED TIME
E104
PERFORM SCAN AT ONCE (X)
DATE AND TIME OF LAST SCAN : 2022/6/16 09:15
SCHEDULE SETTING:
DAILY – 12 : 00
WEEKLY – MONDAY 12 : 00
MONTHLY – 1ST DAY 12 : 00
E106
SCANNING TARGET:
SYSTEM FILE
INSTALLED APPLICATION
NAS-SAVED DATA
E108
B102
M100

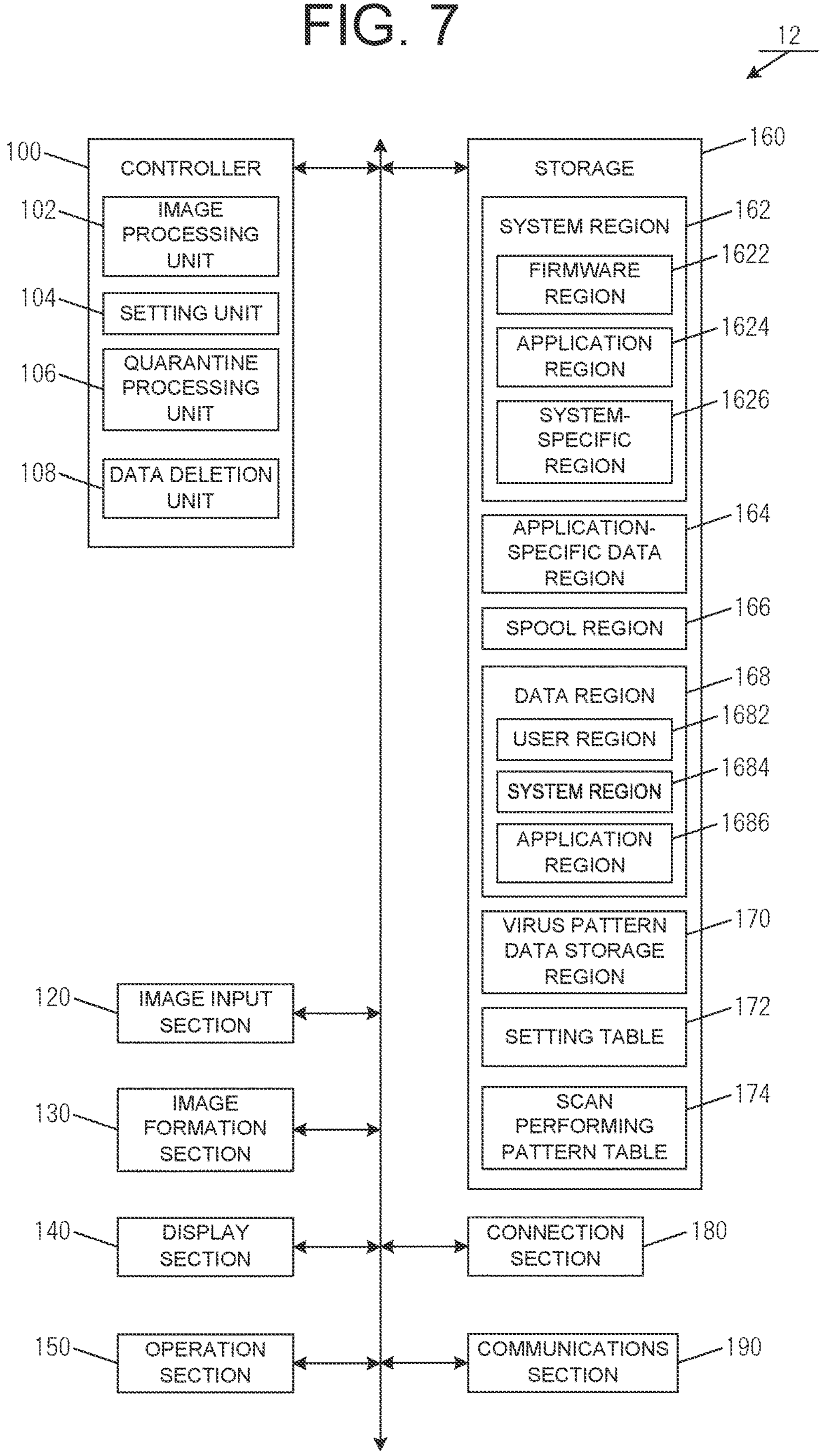

FIG. 7
12
100
CONTROLLER
102
IMAGE PROCESSING UNIT
104
SETTING UNIT
106
QUARANTINE PROCESSING UNIT
108
DATA DELETION UNIT
160
STORAGE
162
SYSTEM REGION
1622
FIRMWARE REGION
1624
APPLICATION REGION
1626
SYSTEM-SPECIFIC REGION
164
APPLICATION-SPECIFIC DATA REGION
166
SPOOL REGION
168
DATA REGION
1682
USER REGION
1684
SYSTEM REGION
1686
APPLICATION REGION
170
VIRUS PATTERN DATA STORAGE REGION
172
SETTING TABLE
174
SCAN PERFORMING PATTERN TABLE
120
IMAGE INPUT SECTION
130
IMAGE FORMATION SECTION
140
DISPLAY SECTION
150
OPERATION SECTION
180
CONNECTION SECTION
190
COMMUNICATIONS SECTION

FIG. 8

| SETTING ITEM | | SETTABLE RANGE | 設定内容 |
|---|---|---|---|
| ⋮ | | ⋮ | ⋮ |
| VIRUS SCANNING FUNCTION | | EFFECTIVE/INEFFECTIVE | EFFECTIVE |
| VIRUS SCANNING DURING ADDITION OF APPLICATION | | EFFECTIVE/INEFFECTIVE | EFFECTIVE |
| VIRUS SCANNING OF INPUT/ OUTPUT DATA | | EFFECTIVE/INEFFECTIVE | EFFECTIVE |
| VIRUS SCANNING AT DESIGNATED TIME | | EFFECTIVE/INEFFECTIVE | EFFECTIVE |
| FREQUENCY IN PERFORMANCE | | MONTHLY/WEEKLY/DAILY | DAILY |
| TIME TO PERFORM | | 00:00 – 23:59 | 23:00 |
| SCANNING TARGET | SYSTEM FILE | TO BE SCANNED/NOT TO BE SCANNED | NOT TO BE SCANNED |
| | INSTALLED APPLICATION | TO BE SCANNED/NOT TO BE SCANNED | NOT TO BE SCANNED |
| | NAS-SAVED DATA | TO BE SCANNED/NOT TO BE SCANNED | TO BE SCANNED |
| AUTOMATIC ERASURE AFTER COMPLETION OF JOB | | EFFECTIVE/INEFFECTIVE | EFFECTIVE |
| SETTING AS TO AUTOMATIC DELETION OF STOPPED JOB | | EFFECTIVE/INEFFECTIVE | EFFECTIVE |
| ⋮ | | ⋮ | ⋮ |

| CLASSIFICATION OF CONDITION | CONDITION OF COMPOUND MACHINE | VIRUS SCANNING RANGE | TIMING OF PERFORMANCE |
|---|---|---|---|
| MATERIAL CHANGE RELATED TO SECURITY | VIRUS SCANNING FUNCTION HAS BEEN CHANGED FROM "INEFFECTIVE" TO "EFFECTIVE" | ALL REGIONS | AT THE TIME OF CHANGE IN SETTING |
| CHANGE RELATED TO SECURITY | SETTING OF HTTPS/FTPS HAS BEEN CHANGED DURING SETTING OF SSL | SPOOL REGION DATA REGION | AT THE TIME OF CHANGE IN SETTING |
| | SETTING OF SMPT-SSL HAS BEEN CHANGED | SYSTEM REGION | AT THE TIME OF CHANGE IN SETTING |
| | SETTING OF LDAP-SSL HAS BEEN CHANGED | SYSTEM REGION | AT THE TIME OF CHANGE IN SETTING |
| | SETTING OF SYSLOG-SSL HAS BEEN CHANGED | SYSTEM REGION | AT THE TIME OF CHANGE IN SETTING |
| INPUT OF DATA | IF "AUTOMATIC ERASURE AFTER COMPLETION OF JOB" FUNCTION IS INEFFECTIVE | DATA REGION | AT THE TIME OF COMPLETION OF JOB |
| | IF "SETTING AS TO AUTOMATIC DELETION OF STOPPED JOB" FUNCTION IS EFFECTIVE | INPUT DATA | AT THE TIME OF PERFORMANCE OF JOB |
| ⋮ | ⋮ | ⋮ | ⋮ |

| SETTING ITEM | | SETTABLE RANGE | SETTING CONTENT |
|---|---|---|---|
| ⋮ | | ⋮ | ⋮ |
| VIRUS SCANNING FUNCTION | | EFFECTIVE/INEFFECTIVE | EFFECTIVE |
| VIRUS SCANNING DURING ADDITION OF APPLICATION | | EFFECTIVE/INEFFECTIVE | EFFECTIVE |
| VIRUS SCANNING OF INPUT/ OUTPUT DATA | | EFFECTIVE/INEFFECTIVE | EFFECTIVE |
| VIRUS SCANNING AT DESIGNATED TIME | | EFFECTIVE/INEFFECTIVE | EFFECTIVE |
| FREQUENCY IN PERFORMANCE | | MONTHLY/WEEKLY/DAILY | DAILY |
| TIME TO PERFORM | | 00:00 – 23:59 | 23:00 |
| SCANNING TARGET | SYSTEM FILE | TO BE SCANNED/NOT TO BE SCANNED | NOT TO BE SCANNED |
| | INSTALLED APPLICATION | TO BE SCANNED/NOT TO BE SCANNED | NOT TO BE SCANNED |
| | NAS-SAVED DATA | TO BE SCANNED/NOT TO BE SCANNED | TO BE SCANNED |
| VIRUS SCANNING IF APPLICATION HAS ABNORMALITY | | EFFECTIVE/INEFFECTIVE | EFFECTIVE |
| APPLICATION PERMITTED TO RUN | | – | FILE SHARING APPLICATION<br>OCR APPLICATION |
| PATH OF ADDED SCANNING TARGET | | – | /storage1/data |
| ⋮ | | ⋮ | ⋮ |

D302 D304 D300

IMAGE FORMING APPARATUS AND CONTROL METHOD

BACKGROUND OF THE INVENTION

Field of the Invention

The present disclosure relates to an image forming apparatus and a control method.

Description of the Background Art

In recent years, an image forming apparatus such as a compound machine (multifunction peripheral/printer (MFP)) performs data transmission to and reception from another apparatus over a network or through some sort of means so as to realize various functions. Under these circumstances, virus scanning is also required for compound machines.

As to the virus scanning, various technologies have been proposed. For instance, it has been proposed to perform a virus check on data if a function to automatically delete data after the completion of a job of data transmission is set to be ineffective.

With such conventional technology, however, even a compound machine having a virus scanning function only performs a virus scan on a specified place at a time designated in advance, without taking the situation of setting for the compound machine or an operation by a user into account. Consequently, an unnecessary virus scan may be performed, or no virus scans may be performed until next time to perform a virus scan although the virus scanning is being required, leading to a delayed detection of a virus.

In view of the problems as above, the present disclosure is aimed at providing an image forming apparatus and a control method both allowing a virus scan to be appropriately performed according to the state of things.

SUMMARY OF THE INVENTION

In order to solve the above problems, an image forming apparatus according to the present disclosure includes: a setter that performs setting of a system; an image former that forms an image according to the setting; and a processor that performs a process for a quarantine against a virus, the setter performs setting concerning security, and the processor implements the quarantine against a virus if the setting concerning security has been changed.

A control method according to the present disclosure is a control method for an apparatus including an image former to form an image according to setting and a processor to perform a process for a quarantine against a virus, the control method including: implementing setting of a system; and implementing the quarantine against a virus if setting concerning security has been changed.

According to the present disclosure, an image forming apparatus and a control method both allowing a virus scan to be appropriately performed according to the state of things are provided.

BRIEF DESCRIPTION OF THE DRAWINGS

FIG. 2 is a diagram for describing a functional configuration of the image forming apparatus of the first embodiment.

FIG. 3 is a diagram illustrating a data organization of a setting table in the first embodiment.

FIG. 4 is a diagram illustrating a data organization of a scan performing pattern table in the first embodiment.

FIG. 6 is a diagram illustrating an example of a setting screen in the first embodiment.

FIG. 7 is a diagram for describing a functional configuration of an image forming apparatus according to a second embodiment.

FIG. 8 is a diagram illustrating a data organization of a setting table in the second embodiment.

FIG. 9 is a diagram illustrating a data organization of a scan performing pattern table in the second embodiment.

FIG. 12 is a diagram illustrating a data organization of a setting table in the third embodiment.

DESCRIPTION OF THE PREFERRED EMBODIMENTS

In the following, embodiments for carrying out the present disclosure are described with reference to the drawings. The embodiments below are each an example for describing the present disclosure, so that a technical scope of the recital in the claims is not limited to the following description.

1. First Embodiment

A first embodiment is an embodiment where an image forming apparatus according to the present disclosure is applied to a compound machine 10. The compound machine 10, also called a multifunction peripheral/printer (MFP), has basic functions (copying function, printing function, scanning function, and the like) of a MFP. In addition, the compound machine 10 in the present embodiment has a virus scanning function.

1.1 Functional Configuration

Figure 1:
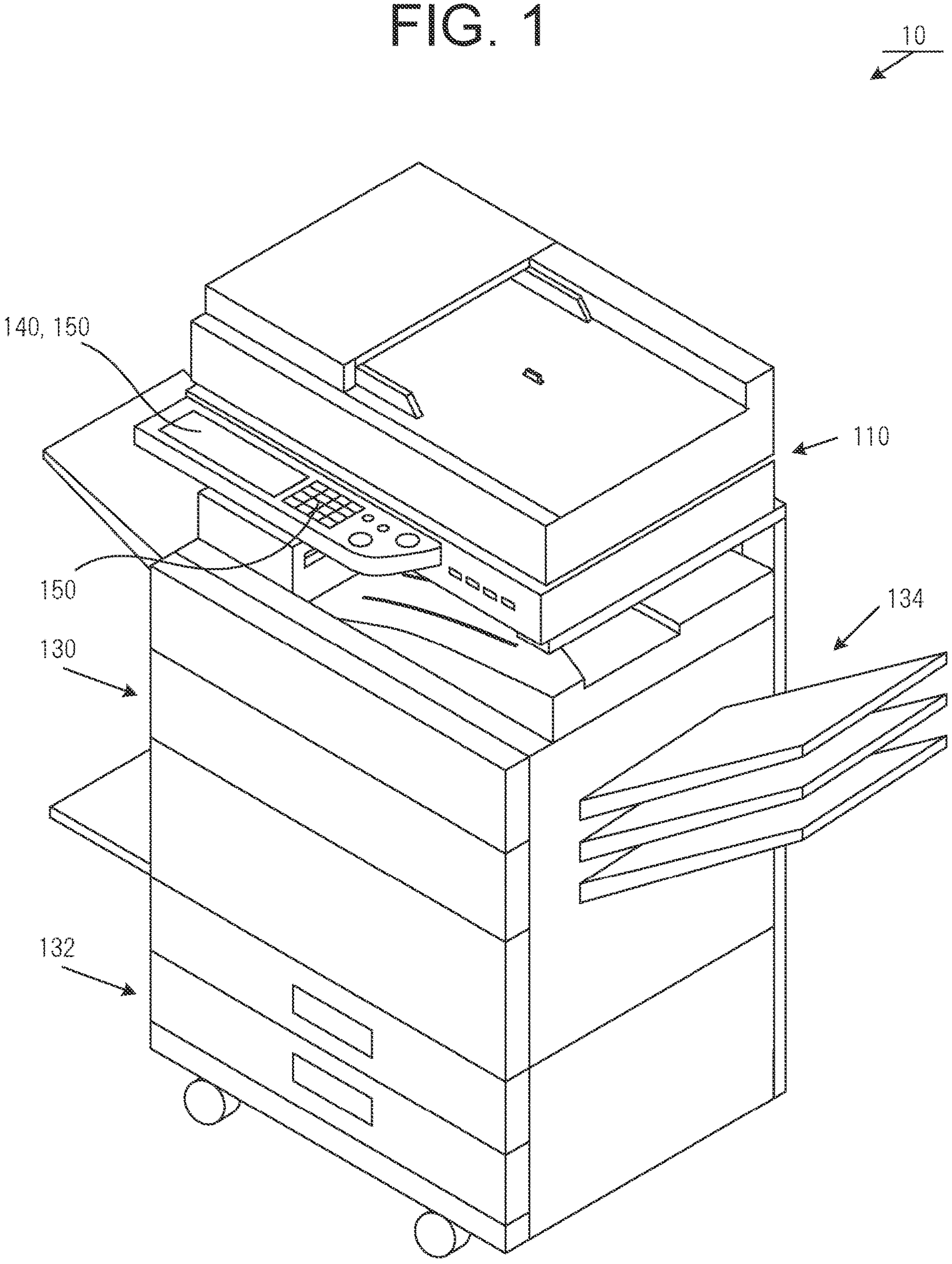
FIG. 1 is an external perspective view of an image forming apparatus according to a first embodiment.

FIG. 1 is an external perspective view of the compound machine 10 according to the first embodiment, and FIG. 2 is a block diagram illustrating a functional configuration of the compound machine 10. As illustrated in FIG. 2, the compound machine 10 includes a controller 100, an image input section 120, an image formation section 130, a display section 140, an operation section 150, a storage 160, a connection section 180, and a communications section 190.

The controller 100 is a functional part for controlling the whole of the compound machine 10. The controller 100 reads and executes various programs stored in the storage 160 so as to realize various functions, and is constituted of one or multiple arithmetic devices (central processing units (CPUs)), for instance. The controller 100 may be formed as a system-on-a-chip (SoC) device having two or more functions out of the functions to be described later.

The controller 100 executes the programs stored in the storage 160 so as to serve as an image processing unit 102, a setting unit 104, and a quarantine processing unit 106.

The image processing unit 102 performs processes relating to various images. For instance, the image processing unit 102 performs a sharpening process or a gradation conversion process on an image input through the image input section 120, the connection section 180 or the communications section 190.

The setting unit 104 performs various settings (system settings) for the compound machine 10. Further, the setting unit 104 provides a setting means for carrying out various settings for the compound machine 10. For instance, the setting unit 104 provides a screen (setting screen) for displaying and changing the settings for the compound machine 10 according to an operation by a user. The setting screen is displayed on the display section 140. The setting screen may be provided as a Web-operated user interface (UI) that is a UI displayed through a Web browser. The setting unit 104 stores a setting content set (input) by the user through the setting screen in a setting table 172 to be described later, so as to reflect the setting content in the compound machine 10.

In the present embodiment, setting of a security policy (setting concerning security) of the compound machine 10 is possible as a setting for the compound machine 10, and the setting unit 104 is assumed to be capable of changing the security policy (changing the setting concerning security) of the compound machine 10.

The setting concerning security is assumed to include setting concerning a process for a quarantine against a virus (setting as to performance of a virus scan, for instance) in the compound machine 10. The process for the quarantine against a virus in the compound machine 10 includes a virus scan for detecting a virus in data stored in the storage 160 of the compound machine 10, a process for disinfection of a detected virus, and a process for isolating or deleting data where a virus has been detected.

The quarantine processing unit 106 performs the process for the quarantine against a virus. In other words, the quarantine processing unit 106 realizes the virus scanning function (application), which the compound machine 10 is equipped with (which is installed in the compound machine 10). If a pattern indicated by virus pattern data stored in a virus pattern data storage region 170 to be described later and part of data stored in the storage 160 conform with each other, for instance, the quarantine processing unit 106 detects a virus, namely, infection of the data with the virus.

The quarantine processing unit 106 may perform the process for the quarantine against a virus, based on setting concerning the quarantine against a virus stored in the setting table 172. In addition, the quarantine processing unit 106 may have a function to detect a change in internal condition of the compound machine 10 or a change in data managed by the compound machine 10 (data stored in the storage 160). In that case, the quarantine processing unit 106 performs the virus scan on a storage region influenced by the change in internal condition of the compound machine 10 or the change in data managed by the compound machine 10. The quarantine processing unit 106 may detect a hacking attack and, if an attack from a specified Internet Protocol (IP) address has become clear, perform the virus scan on a region in the storage 160 relating to a remote job, irrespective of communication sender. The image input section 120 inputs an image to the compound machine 10. The image input section 120 is constituted of a scanner to read an original placed on an original table, for instance. The scanner is, for instance, a device that uses an image sensor such as a charge-coupled device (CCD) and a contact image sensor (CIS) to convert an image into electric signals, and quantizes and encodes the electric signals. The image input section 120 may be constituted of an interface (terminal) for reading an image stored in a universal serial bus (USB) memory so as to input an image read from the USB memory. The image input section 120 may also receive an image from another apparatus through the connection section 180 or the communications section 190 so as to input the received image.

The image formation section 130 forms (prints) an image on a recording medium such as a recording sheet according to a setting content set through the setting screen and thus stored in the setting table 172. For instance, the image formation section 130 forms a color image or only forms a monochrome image according to the setting of an available color mode. The image formation section 130 is constituted of a printing device such as a laser printer using an electrographic technology, for instance. As an example, the image formation section 130 feeds a recording sheet from a paper feed tray 132 included in the compound machine 10, forms an image on a surface of the recording sheet, and discharges the recording sheet from a paper discharge tray 134 included in the compound machine 10.

The display section 140 displays various kinds of information. The display section 140 is constituted of a display device such as a liquid crystal display (LCD), an organic electroluminescence (EL) display, and a micro light emitting diode (LED) display, for instance.

The operation section 150 receives an instruction on an operation by a user of the compound machine 10. The operation section 150 is constituted of an input device such as a key switch (hard keys) and a touch sensor. As to the touch sensor, any of common detection methods, such a resistive method, an infrared method, an inductive method, and an electrostatic method, will do as a method for detecting an input by contact (touch). The compound machine 10 may be equipped with a touch panel that the display section 140 and the operation section 150 are integrally formed into.

The storage 160 stores various programs necessary to the working of the compound machine 10, and various kinds of data. The storage 160 is constituted of such a storage as a solid state drive (SSD) that is a semiconductor memory, and a hard disk drive (HDD).

The storage 160 secures a system region 162, an application-specific data region 164, a spool region 166, a data region 168, and the virus pattern data storage region 170, and stores the setting table 172 and a scan performing pattern table 174. The system region 162, the application-specific data region 164, the spool region 166, and the data region 168 are each a region that the virus scan is to be performed on.

The system region 162 is a region where an operating system (OS) for the compound machine 10 and data on the basic functions of the compound machine 10 are stored, and where data is temporarily stored during the working of the OS or the basic functions. The basic functions of the compound machine 10 refer to functions that the compound machine 10 originally has, including the copying function, the printing function, and the scanning function.

The system region 162 may include the following regions.

(1) Firmware Region 1622

A firmware region 1622 is a region where firmware of the compound machine 10 is stored and decompressed.

(2) Application Region 1624

An application region 1624 is a region where an application is stored, and data is temporarily stored during the running of the application. The application refers to a program for extending the basic functions of the compound machine 10 and adding a new function to the compound machine 10. The application region 1624 may include a shared region available to the application and a system (the OS, for instance) for the compound machine 10 in common.

(3) System-Specific Region 1626

A system-specific region 1626 is a region specific to the system, where the OS, programs for realizing the basic functions, and the like are stored. The system-specific region 1626 is a region not used by the application nor the user.

The application-specific data region 164 is a region where application-specific data is stored. In the application-specific data region 164, setting information on an application is stored, for instance.

The spool region 166 is a region that is temporarily used by the compound machine 10 when a specified function is realized (a job is performed) by the compound machine 10. If data is input from an external device to the compound machine 10, for instance, the input data is temporarily stored in the spool region 166. If data is output from the compound machine 10 to the external device, the data to be output is temporarily stored in the spool region 166.

The data region 168 is a region where data on a function (job) used by the user is stored. The data region 168 is chiefly secured in a storage (auxiliary storage). The data region 168 may be constituted of a network attached storage (NAS).

The data region 168 may include the following regions.

(1) User Region 1682

A user region 1682 is a region where data input by the user is stored. For instance, the data on a document or an image, which is acquired or received from another apparatus or storage (USB memory, for instance), is stored in the user region 1682.

(2) System Region 1684

A system region 1684 is a region where data on the system (OS and basic functions) of the compound machine 10 is stored.

(3) Application Region 1686

An application region 1686 is a region where data on an application is stored.

The regions as above are examples. According to the model, the basic functions, the software/hardware configuration, and the like of the compound machine 10, nothing but necessary regions need to be appropriately secured in the storage 160.

In the virus pattern data storage region 170, the virus pattern data is stored. The virus pattern data is the data, in which an appearance pattern of data characteristic of or specific to a known computer virus is defined, and is stored as a result of acquisition from a device or service providing the virus pattern data.

The setting table 172 is a table that stores information on the settings for the compound machine 10. As an example, the setting table 172 is a table where a setting item, a settable range that indicates a range or type settable as a setting content for the setting item, and the setting content, which has been set for the setting item, are associated with one another, as illustrated in FIG. 3. The setting table 172 previously stores initial values, for instance, which are updated by the setting unit 104.

In the setting table 172, various setting contents related to the following settings concerning the quarantine against a virus, which are settings concerning security, are stored, in addition to a content of setting concerning user authentication or user management for the compound machine 10 and a content of setting concerning an image formed by the compound machine 10.

(1) Setting as to Effectiveness/Ineffectiveness of Virus Scanning Function (a Section D100 in FIG. 3)

Setting as to effectiveness/ineffectiveness of the virus scanning function refers to setting for changing the virus scanning function in the compound machine 10 on the whole from “effective (ON)” to “ineffective (OFF)” and vice versa.

(2) Setting as to Effectiveness/Ineffectiveness of Virus Scanning of Input/Output Data (a Section D102 in FIG. 3)

Setting as to effectiveness/ineffectiveness of virus scanning of input/output data refers to setting as to whether to scan the input data or file in a phase where the data (scanning data, printing data or facsimile (FAX) data, for instance) to be input to the compound machine 10 has been input from outside.

(3) Setting as to Virus Scanning at Designated Time (a Section D104 in FIG. 3)

Setting as to virus scanning at a designated time refers to setting of a schedule of the virus scanning, that is to say, setting for designating a day of the week or time when the virus scan is to be performed, so as to cause the virus scan to be automatically performed at designated date and time. The setting as to the virus scanning at a designated time may be carried out by setting a frequency that the virus scan is to be performed at (monthly, weekly or daily, for instance) or setting time when the virus scan is to be performed, as illustrated in a section D106 in FIG. 3. If the frequency is set to “monthly”, the date (“the fifteenth of every month”, for instance) or a specified day of the week (“the every first Sunday”, for instance), when the virus scan is to be performed, may be settable. If the frequency is set to “weekly”, the day of the week (“Sunday”, for instance), when the virus scan is to be performed, may be settable.

(4) Setting of Scanning Target (a Section D108 in FIG. 3)

Setting of a scanning target refers to setting for designating data for each kind to or not to be taken as a virus scanning target if the virus scan is performed at a designated time (the process for the quarantine against a virus is periodically performed) and an on-demand virus scan is performed. In other words, it is assumed that a storage region where the virus scan is to be performed is selectable. The data includes three kinds of data, namely, a system file (a file stored in the system region 162), an installed application (a file stored in the application-specific data region 164), and an NAS-saved data (a file stored in the data region 168) as illustrated in FIG. 3, for instance. For each kind, the data is set to or not to be taken as a scanning target (that is to say, to be scanned or not to be scanned).

The data stored in the spool region 166 is subjected to virus scanning only if the virus scanning of input/output data is set to be effective. Consequently, in the present embodiment, the data stored in the spool region 166 is not assumed as an object of the setting of the scanning target.

The setting contents stored in the setting table 172 may include a setting content as to whether to perform the virus scan during the addition (installation) of an application and a setting content as to whether to allow the on-demand (user-operated) virus scan to be performed, in addition to the setting contents as above. Thus, the compound machine 10 may be allowed to perform the virus scan depending on the type of access to the storage 160 as a storage region, that is to say, to perform the virus scan at the time of installation of an application, at the time of on-demand working (user operation), at a scheduled time or at the time of data input or output.

The scan performing pattern table 174 is a table where a condition of the compound machine 10 and a range of a virus scan performed according to the condition of the compound machine 10 are associated with each other. As an example, classification of the condition ("a material change related to the security has been made", for instance), a concrete condition of the compound machine 10 that is detected ("the virus scanning function has been changed from an ineffective state to an effective state", for instance), and the range of a virus scan performed according to the condition of the compound machine 10 ("all regions", for instance) are associated with one another in the scan performing pattern table 174, as illustrated in FIG. 4. The scan performing pattern table 174 may be stored in advance or may be settable by the user.

The connection section 180 connects the compound machine 10 and another apparatus to each other. For instance, the connection section 180 is constituted of a USB interface, to which such a storage as a USB memory, or the like is connected. The connection section 180 may be constituted of a device (antenna, for instance) for achieving short-range wireless communications, such as Near-field communication (NFC) and Bluetooth (registered trademark), and thus be connectable with another apparatus through a short-range wireless communications means.

The communications section 190 communicates with another apparatus or device through a network such as a local area network (LAN) and a wide area network (WAN). The communications section 190 is constituted of a communications device or communications module such as a network interface card (NIC) used for wired/wireless LAN, for instance. The communications section 190 may include an interface (I/F) connectable with a network (network I/F).

The communications section 190 may connect to a communications network such as a public network, a LAN, and the Internet so as to be capable of using a communications method such as faxing and electronic mailing to transmit data outside over the communications network.

1.2 Flow of Processing

Figure 5:
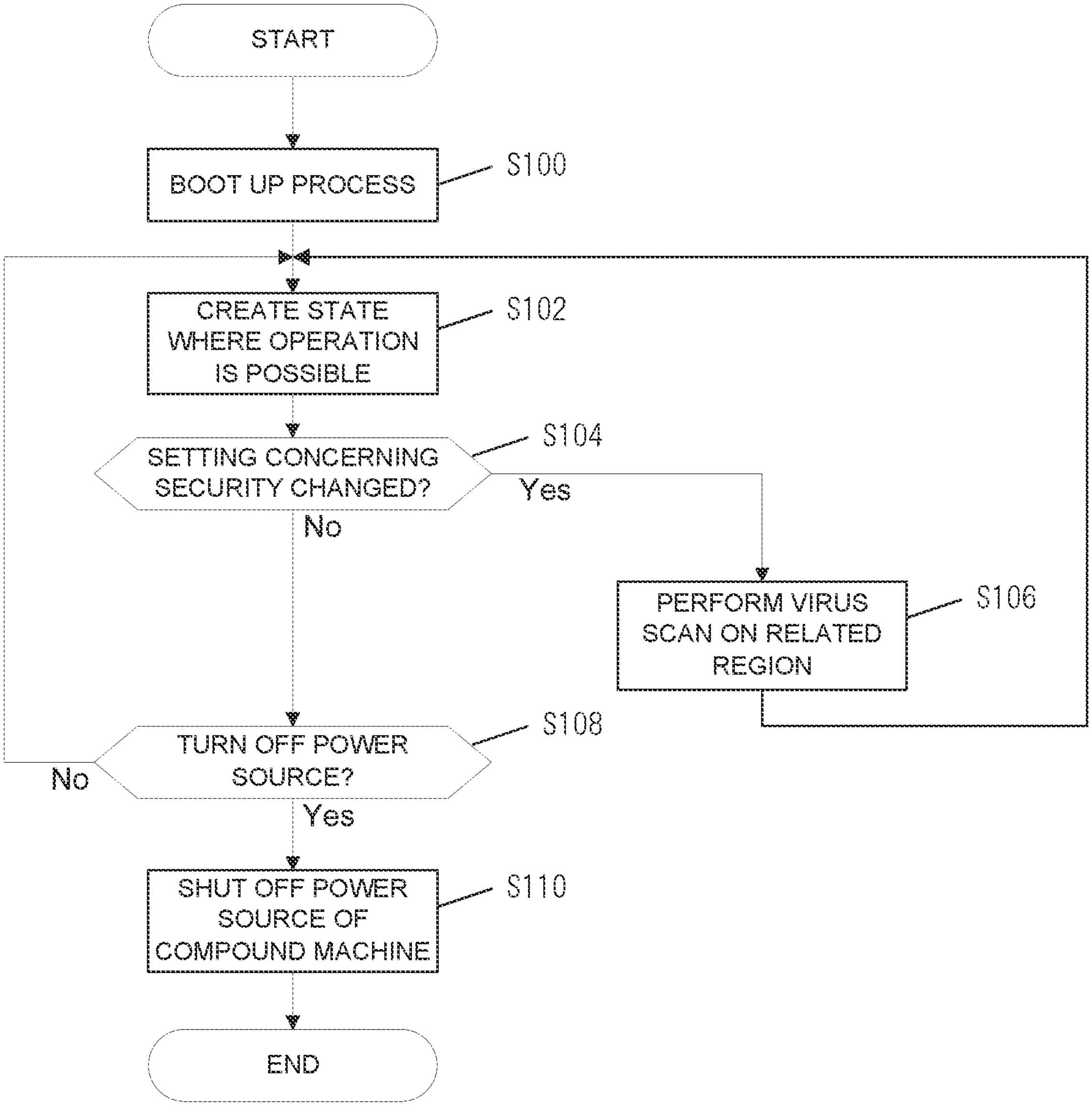
FIG. 5 is a flowchart illustrating a flow of main processing in the first embodiment.

Referring to FIG. 5, main processing performed by the compound machine 10 is described. For instance, the controller 100 reads, at a time when a power source is turned on, a program stored in the storage 160 so as to cause the main processing to be performed. In the following description, the process for the quarantine against a virus, which is performed by the quarantine processing unit 106, is assumed as the virus scan.

Initially, the controller 100 performs a boot up process (step S100). The boot up process is a process for putting the compound machine 10 into a normal boot up state, namely, a process for feeding electric power to the respective functional parts of the compound machine 10 or achieving a warmup of the image formation section 130, for instance.

Then, the controller 100 creates a state where the operation by the user is possible (step S102). For instance, the controller 100 displays a home screen on the display section 140. The home screen includes an instruction means (function buttons, for instance) for instructing to use the basic functions of the compound machine 10 including the copying function and the scanning function. The user selects a function button so as to cause the compound machine 10 to perform a process (job) that uses the function as selected by the user. The home screen may also include an instruction means (system setting buttons, for instance) for changing the system settings for the compound machine 10. In this regard, the controller 100 (the setting unit 104) may display the setting screen on the display section 140 if a system setting button is selected. The settings for the compound machine 10 may be changed based on an operation performed by the user on the setting screen.

Next, the controller 100 determines whether the setting concerning security has been changed (step S104). The controller 100 determines that the setting concerning security has been changed if the condition of the compound machine 10 has been stored in a "condition of compound machine" column of the scan performing pattern table 174, for instance.

If determining that the setting concerning security has been changed, the controller 100 (the quarantine processing unit 106) performs the virus scan on a related region according to the condition of the compound machine 10 (i.e., the content of the changed setting) (Yes in step S104→step S106).

For instance, the quarantine processing unit 106 performs the virus scan as stated below if the information illustrated in FIG. 4 is stored in the scan performing pattern table 174.

(1) If the Virus Scanning Function has been Changed from "Ineffective" to "Effective".

The quarantine processing unit 106 performs the virus scan on all the regions in the storage 160 of the compound machine 10 whenever the virus scanning function has been changed from "ineffective" to "effective".

Depending on the condition of the compound machine 10 when the virus scanning function has been changed from "ineffective" to "effective", the virus scan, which is performed on all the regions in the storage 160, may hamper a basic function exerted by the compound machine 10 in use. In that case, the quarantine processing unit 106 may be so scheduled as to perform the virus scan on all the regions in the storage 160 within a period of time when frequency in the use of the compound machine 10 is low.

Even if the data region 168 is a sole region taken as a target for the virus scan performed according to a normal schedule, for instance, the quarantine processing unit 106 changes the region as a virus scanning target to all the regions with respect to the virus scan, which is performed first after the virus scanning function has been changed from "ineffective" to "effective". As a result, the quarantine processing unit 106 is able to perform an appropriate virus scan without deteriorating usability of the compound machine 10.

Thus, the quarantine processing unit 106 performs the virus scan on all the regions in the storage 160, deeming that all the functions of the compound machine 10 are influenced, if a material change has been made in a setting related to the security of the compound machine that is to say, the virus scanning function has been changed from "ineffective" to "effective", for instance. In other words, the quarantine processing unit 106 is capable of performing a more appropriate virus scan, which leads to the improvement in security.

(2) If Setting of Hypertext Transfer Protocol Secure (HTTPS)/File Transfer Protocol Secure (FTPS) has been Changed.

During the setting of Secure Sockets Layer (SSL) as a security setting for the compound machine 10, setting of a function allowing input and output of data from and to an external device, such as HTTPS/FTPS, may be changed. In that case, the quarantine processing unit 106 performs the virus scan on the data region 168 and the spool region 166. In other words, if the setting of the function allowing input and output of data from and to an external device has been changed, the quarantine processing unit 106 performs the virus scan on regions related to such change (the data region 168 and the spool region 166) at the time of the change even if the virus scan is periodically performed on the data region 168 and the spool region 166. The virus scan, which is performed on the data region 168 and the spool region 166, may hamper the basic function of the compound machine 10 in use depending on the condition of the compound machine 10. In that case, the quarantine processing unit 106 may be so scheduled as to perform the virus scan on the data region 168 and the spool region 166 within the period of time when frequency in the use of the compound machine 10 is low. Alternatively, the quarantine processing unit 106 may take the data region 168 and the spool region 166 as a virus scanning target in addition to a region set as a target (scanning target) for the virus scanning as scheduled before (the quarantine against a virus, which is periodically performed).

(3) If Setting of Simple Mail Transfer Protocol (SMTP)-SSL, Lightweight Directory Access Protocol (LDAP)-SSL or Syslog-SSL has been Changed.

During the setting of SSL as a security setting for the compound machine 10, setting of a function allowing input and output by the system (OS, for instance) of the compound machine may be changed. In that case, the quarantine processing unit 106 performs the virus scan on the system region 162. If the setting of the function allowing input and output by the system has been changed, the quarantine processing unit 106 performs the virus scan on a region related to the change (the system region 162) at the time of the change even if the virus scan is periodically performed on the system region 162. The virus scan, which is performed by the quarantine processing unit 106 on the system region 162, may hamper the basic function of the compound machine 10 in use, similarly to the above case (2). In that case, the quarantine processing unit 106 may be so scheduled as to perform the virus scan on the system region 162 within the period of time when frequency in the use of the compound machine 10 is low, or may take the system region 162 as a virus scanning target in addition to the region set as a target (scanning target) for the virus scanning as scheduled before (the quarantine against a virus, which is periodically performed).

If any of the settings for the compound machine 10 has been changed, the quarantine processing unit 106 performs a process in step S106 so as to perform the virus scan on an appropriate region or appropriate regions according to the changed setting. If a specified setting concerning security has been changed as in the above cases (2) and (3), in particular, the quarantine processing unit 106 performs the virus scan according to the changed setting more appropriately in a pinpoint manner. After the process in step S106 is completed, the processing by the controller 100 returns to step S102.

If determining in step S104 that the setting concerning security has not been changed, the controller 100 determines whether to turn off a power source of the compound machine 10 (No in step S104→step S108). If the power source of the compound machine 10 is to be turned off, the controller 100 shuts off the power source of the compound machine 10 (Yes in step S108→step S110). For instance, the controller 100 performs a logout process if the user still logs in the compound machine 10, stores the date and time when the power source is shut off as a log, and transmits information notifying that the power source is shut off to another apparatus through the communications section 190. If the power source of the compound machine 10 is not to be turned off, the processing by the controller 100 returns to step S102 (No in step S108→step S102).

1.3 Working Example

Referring to FIG. 6, an example of a setting screen W100 is described as a working example of the present embodiment. The setting screen W100 is a screen used to carry out setting as to the virus scanning according to the normal schedule. The setting screen W100 is displayed if a "system setting" button is selected on the home screen and, moreover, an item "virus scan setting" is selected from menu items on a security setting menu, for instance.

A button B100 is a button for causing a setting content input on the setting screen W100 to be registered at the compound machine 10, so as to reflect the content of a changed setting in the compound machine 10.

An area E100 is an area where the setting as to effectiveness/ineffectiveness of the virus scanning function is changed. The virus scanning function is set to be "ineffective" by default, for instance. If the virus scanning function is ineffective, a checkbox, a dropdown list, and a button that are displayed below the area E100 may be made ineffective (may be grayed out or may not be displayed). In that case, the checkbox and the like displayed below the area E100 become operable if the virus scanning function is changed to "effective" by the user.

In the present embodiment, the virus scanning function is changed from "ineffective" to "effective" in the compound machine 10 if the virus scanning function is changed from "ineffective" to "effective" on the setting screen W100 and the button B100 is selected. At that time, the virus scan is performed by the quarantine processing unit 106 on all the regions in the storage 160.

An area E102 is an area where the setting as to effectiveness/ineffectiveness of the virus scanning of input/output data is changed. The virus scanning of input/output data is set to be "effective" by default, for instance. If the virus scanning of input/output data is effective, the quarantine processing unit 106 performs the virus scan on data to be input at a time when the data is input from another apparatus such as a facsimile machine or another device such as a USB memory, and on data to be output at a time when the data is output to another apparatus.

An area E104 is an area where the virus scan is set to or not to be performed at a designated time. If a function to perform the virus scan at a designated time is effective, it is possible to set the time to perform the virus scan in an area E106, and set the virus scanning target (region or kind of data) in an area E108.

The spool region 166 is a region that the virus scan is performed on only if input/output data is subjected to virus scanning. Therefore, as indicated in the area E108, designation of a region as a virus scanning target is not explicitly set.

A button B102 is a button ("perform scan at once" button) for performing the virus scan instantaneously (performing the on-demand virus scan). The user performs an operation to select the button B102 so as to cause the compound machine 10 to perform the virus scan at the time when the button B102 is selected, apart from the virus scanning according to schedule.

In the area E108, among the system file, the installed application, and the NAS-saved data, that is to say, among the system region 162, the application-specific data region 164, and the data region 168, the checked region or regions are taken as a virus scanning target. In other words, the regions checked in the area E108 constitute targets for the virus scanning both in the case where the virus scan is performed based on the setting of the schedule when it is effective to "perform the virus scan at a designated time" and in the case where the virus scan is performed as a result of selection of the "perform virus scan at once" button.

In addition to the setting screen W100 illustrated in FIG. 6, a screen for carrying out setting concerning SSL may be capable of being displayed on the display section 140 of the compound machine 10 as a screen for carrying out the setting concerning security. The screen for carrying out the setting concerning SSL is displayed if a menu item M100 in FIG. 6 is selected, for instance. If a setting content is changed through the screen for carrying out the setting concerning SSL and an operation to reflect the setting content after the change in the compound machine 10 is performed, the compound machine 10 changes the relevant setting for the compound machine 10. At this time, the quarantine processing unit 106 performs the virus scan on a corresponding region according to the changed setting. Thus, the virus scan is only performed on the region, which is influenced by the change of the setting, so that the virus scan normally ends in a short time with a less load on the compound machine 10. Since the virus scan is performed immediately after the change of the setting, virus detection is instantaneously put into practice.

The above description is made under the assumption that the process for the quarantine against a virus is the virus scan, while, in addition to the virus scan, a process for disinfection of a virus or a process for isolating or deleting data infected with a virus may be performed as the process for the quarantine against a virus.

As described above, the compound machine 10 in the present embodiment performs the process for the quarantine against a virus such as the virus scan according to a setting situation of the settings concerning security or the fact that an operation to change the setting situation has been performed. In particular, the compound machine 10 in the present embodiment performs the virus scan on a necessary place (region) at a necessary time according to the setting content as changed during the change in setting. In other words, the compound machine 10 in the present embodiment appropriately performs the virus scan and thus protects the compound machine 10 itself from a malicious attack.

Unlike the conventional technology, the compound machine 10 in the present embodiment does not perform the virus scan on all the regions in the storage 160 in every case but performs the virus scan on a necessary region (appropriate range of virus scanning) according to the setting content or setting situation as changed. In other words, if a change in setting related to the security has been made, the virus scan is performed on at least an influenced region. As a result, the virus scan ends in a short time with a less load on the compound machine 10. Thus, the compound machine 10 in the present embodiment is capable of avoiding such problems as arising in that it takes a long time to perform the virus scan and that the virus scan prevents other operations.

2. Second Embodiment

Next, a second embodiment is described. The second embodiment is an embodiment where the processing in the first embodiment is carried out, and in addition, the virus scan is only performed on an influenced region or data according to a setting situation of functions of a compound machine and a condition of the compound machine, and timing of performance of the virus scan is changed. For the present embodiment, FIGS. 2, 3, 4, and 5 in the first embodiment are replaced by FIGS. 7, 8, 9, and 10, respectively. The identical functional parts and processes are given the identical reference signs, and the description on such functional parts and processes is omitted.

2.1 Functional Configuration

Referring to FIG. 7, a functional configuration of a compound machine 12 in the present embodiment is described. The compound machine 12 is different from the compound machine in that the controller 100 also serves as a data deletion unit 108.

The data deletion unit 108 realizes a function to automatically delete data (an image, for instance) input from an external device according to a situation of performance of a job based on the data. For instance, the data deletion unit 108 deletes data in the following cases.

(1) If a job based on the data has been completed (a case of automatic erasure after the completion of a job).

(2) If a job based on the data is not performed and as such meets a specified condition (a case of setting as to automatic deletion of a stopped job).

The specified condition in the case (2) means that a specified time has elapsed since the input of the data, that the compound machine 12 does not have a function nor include an option (such as a device fitted to the compound machine 12 from outside) for processing the input data, or the like.

Thus in the present embodiment, if an "automatic erasure after the completion of a job" function is effective and if a "setting as to automatic deletion of a stopped job" function is effective, data relating to the job in question is automatically deleted by the data deletion unit 108. If the above functions are ineffective, even data that can automatically be deleted is not deleted and remains stored in the data region 168. The data, which can automatically be deleted, remains stored in the data region 168, so that the user is able to re-perform the job based on the data.

In the present embodiment, the setting table 172 includes information illustrated in FIG. 8. As illustrated in a section D200 in FIG. 8, information notifying that the "automatic erasure after the completion of a job" function is effective or ineffective and information notifying that the "setting as to automatic deletion of a stopped job" function is effective or ineffective are stored in the setting table 172 in addition to the information as included in the table illustrated in FIG. 3. In other words, a setting content relating to the function to automatically delete input data is stored in the setting table 172, and the setting unit 104 allows setting as to the function to automatically delete input data.

In the present embodiment, the scan performing pattern table 174 includes information illustrated in FIG. 9. In the scan performing pattern table 174 in the present embodiment, the timing of performance of the virus scan ("at the time of change in setting", for instance) is associated with the information as included in the table illustrated in FIG. 4. As a result, the quarantine processing unit 106 performs the virus scan according to the condition of the compound machine 12, on a virus scanning range associated with the condition under timing of performance associated with the condition.

As illustrated in a section D202 in FIG. 9, the scan performing pattern table 174 in the present embodiment includes "input of data" classified as a condition of the compound machine 12. In particular, in the present embodiment, the virus scan is performed according to the condition of the compound machine 12 if the data input from the external device is not deleted by the data deletion unit 108 but remains stored in the data region 168 in the storage 160.

2.2 Flow of Processing

Figure 10:
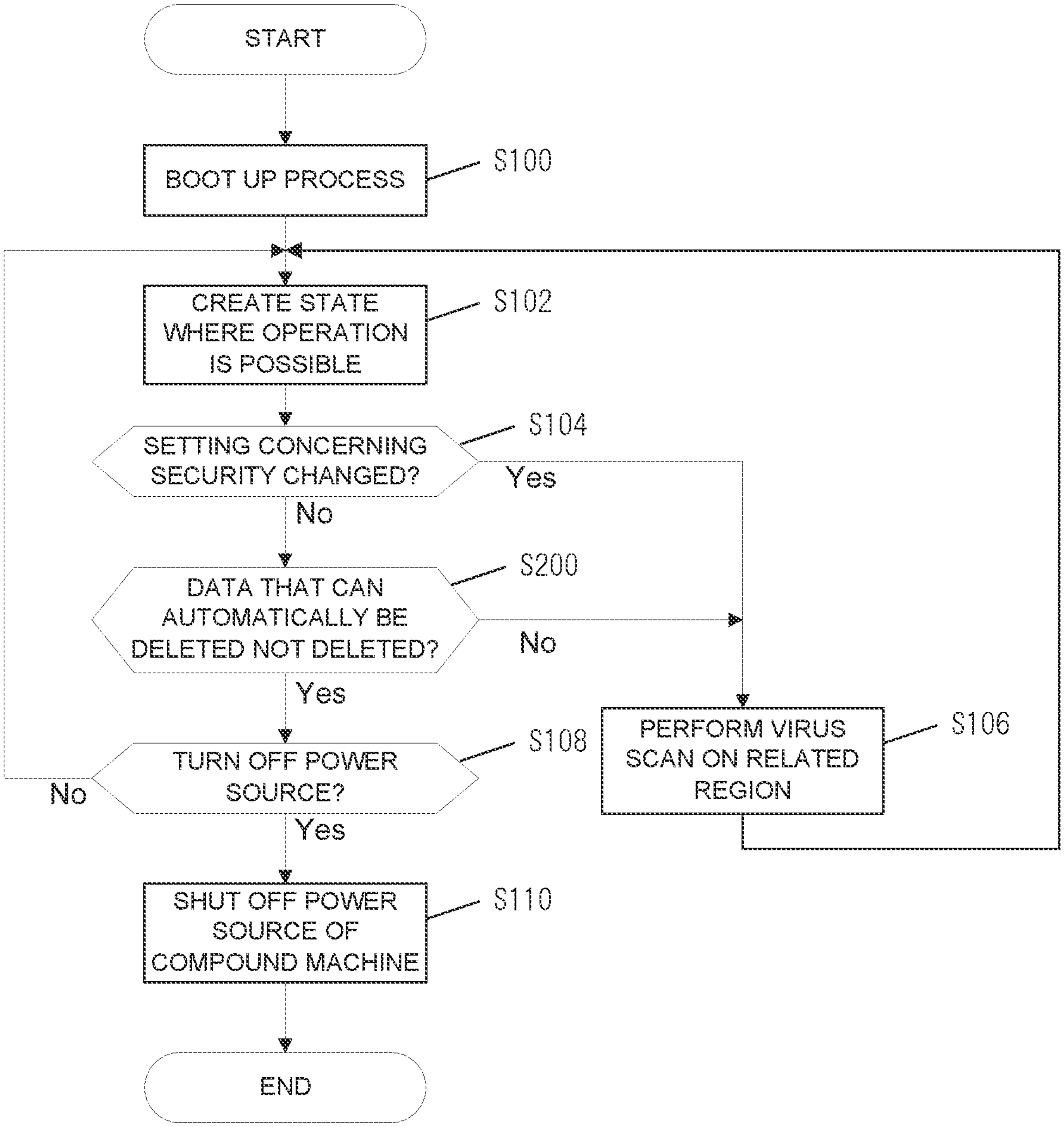
FIG. 10 is a flowchart illustrating a flow of main processing in the second embodiment.

Referring to FIG. 10, main processing performed by the compound machine 12 in the present embodiment is described. In the present embodiment, if determining that the setting concerning security has not been changed, the controller 100 determines whether the data, which can automatically be deleted, has not been deleted (No in step S104→step S200). If determining that the data, which can automatically be deleted, has been deleted, the controller 100 performs a process in step S108 (Yes in step S200→step S108).

If determining that the data, which can automatically be deleted, has not been deleted, the controller 100 (the quarantine processing unit 106) performs the virus scan on an influenced region according to the data (No in step S200→step S106). For instance, the quarantine processing unit 106 performs the virus scan as stated below if the information illustrated in FIG. 9 is stored in the scan performing pattern table 174.

(1) If the "automatic erasure after the completion of a job" function is ineffective. If the "automatic erasure after the completion of a job" function is ineffective and data related to the job (targeted job) as performed is stored in the data region 168, the quarantine processing unit 106 performs the virus scan on the data region 168, in which the data is stored, after the completion of the targeted job.

Even if a function to "perform the virus scan on input/output data" is effective, the quarantine processing unit 106 performs the virus scan on the data region 168 not only at the time of data input or output but after the completion of the targeted job.

If the "automatic erasure after the completion of a job" function is changed to "effective", data related to a targeted job is not stored in the data region 168 after the completion of the targeted job, so that the data region 168 escapes such influence that the input data remains stored in the data region 168. Consequently, the quarantine processing unit 106 does not need to perform the virus scan on the data region 168 after the completion of the job if the "automatic erasure after the completion of a job" function is changed to "effective".

(2) If the "setting as to automatic deletion of a stopped job" function is effective. If the "setting as to automatic deletion of a stopped job" function is effective and data is input so as to input a job, the quarantine processing unit 106 performs the virus scan on data related to the job (targeted job) during the performance of the targeted job (immediately before the performance of the job).

Virus scanning of data is commonly carried out at the time of input of the data. The quarantine processing unit 106, however, changes the timing of performance of the virus scan so as to perform the virus scan on the data related to the targeted job not at the time of input of the targeted job but immediately before the performance of the targeted job. Thus, the quarantine processing unit 106 performs the virus scan on data immediately before the performance of a targeted job so as to appropriately perform the virus scan without affecting other (preferential) job that may be delayed by a virus scan performed at the time of input of the data.

Even if data was input, the quarantine processing unit 106 may omit to perform the virus scan on the data if a job based on the data has automatically been deleted by the data deletion unit 108 as a stopped job. If the "setting as to automatic deletion of a stopped job" function is ineffective, the quarantine processing unit 106 may perform the virus scan on data related to a stopped job.

As described on the above cases (1) and (2), if the data, which can automatically be deleted, has not been deleted, the quarantine processing unit 106 performs the quarantine against a virus (the virus scan) on the data at a time corresponding to the setting of the "automatic erasure after the completion of a job" function or the "setting as to automatic deletion of a stopped job" function.

As described above, the compound machine 12 in the present embodiment performs the virus scan on an appropriate region or target (data) at an appropriate time if the setting situation or the content of an operation by the user, such as input of data, has brought about a situation where virus scanning is required. Consequently, the compound machine 12 in the present embodiment performs the virus scan only on an influenced region or changes the timing of performance of the virus scan according to the set function, which makes it possible to avoid such problems as arising in that it takes a long time to perform the virus scan and that the virus scan prevents other operations.

3. Third Embodiment

Next, a third embodiment is described. Unlike the first embodiment, the third embodiment is an embodiment where, if an abnormality has been detected in a compound machine, the virus scan is performed on an appropriate region according to the detected abnormality. For the present embodiment, FIGS. 2, 3, and 5 in the first embodiment are replaced by FIGS. 11, 12, and 13, respectively. The identical processes are given the identical reference signs, and the description on such processes is omitted.

3.1 Functional Configuration

Figure 11:
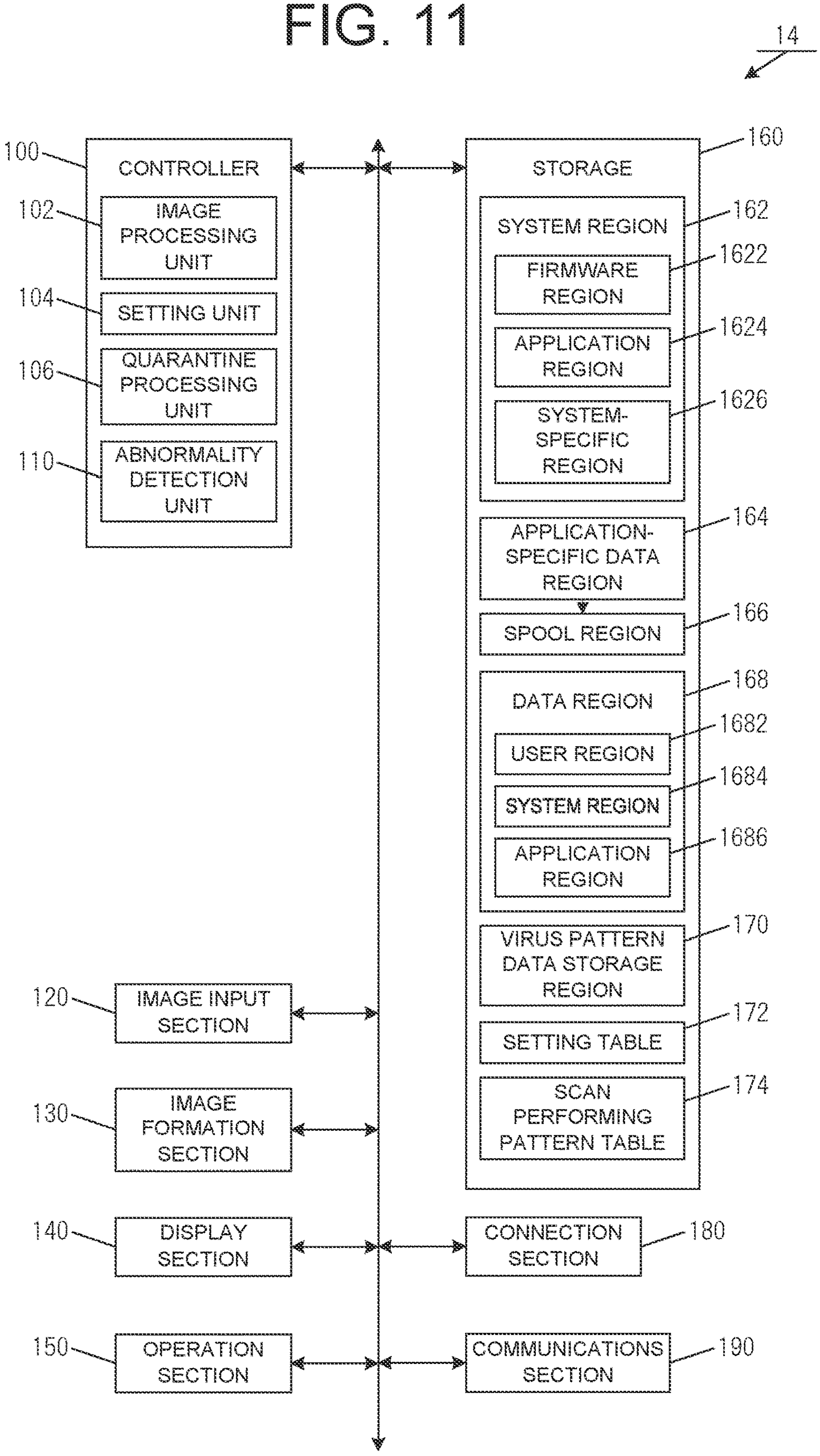
FIG. 11 is a diagram for describing a functional configuration of an image forming apparatus according to a third embodiment.

Referring to FIG. 11, a functional configuration of a compound machine 14 in the present embodiment is described. The compound machine 14 is different from the compound machine 10 in that the controller 100 also serves as an abnormality detection unit 110. The abnormality detection unit 110 detects an abnormality that has occurred in the compound machine 14. In particular, the abnormality detection unit 110 in the present embodiment realizes a "mandatory access control" function of the compound machine 14, and detects an abnormality of an application executed by the compound machine 14. Specifically, the abnormality detection unit 110 detects the following abnormalities.

(1) Execution of an abnormal application.

(2) Abnormal quit of an application.

The abnormal application refers to, for instance, an application not included in the applications whose execution is permitted by the "mandatory access control" (whitelist) function, which is set in advance for the compound machine 14. In other words, the abnormal application refers to an application not included in a whitelist set in advance, namely, an application not assumed to be executed.

In the present embodiment, the setting table 172 includes information illustrated in FIG. 12. As illustrated in FIG. 12, setting related to the "mandatory access control" function (a section D300 in FIG. 12) is stored in the setting table 172 in addition to the information as included in the table illustrated in FIG. 3.

Specifically, a function to perform the virus scan when an application has an abnormality (that is to say, when an abnormality of an application has been detected) is settable to be effective or ineffective, as the "mandatory access control" function.

The setting table 172 further includes a list of applications whose execution is permitted (whitelist: a section D302 in FIG. 12), and a path of an added scanning target (a section D304 in FIG. 12). In the path of an added scanning target, a place taken as a virus scanning target is stored in addition to the storage 160 of the compound machine 14 if an abnormality of an application has been detected. The path of an added scanning target may indicate a specified region (storage region) in the storage 160 of the compound machine 14.

3.2 Flow of Processing

Figure 13:
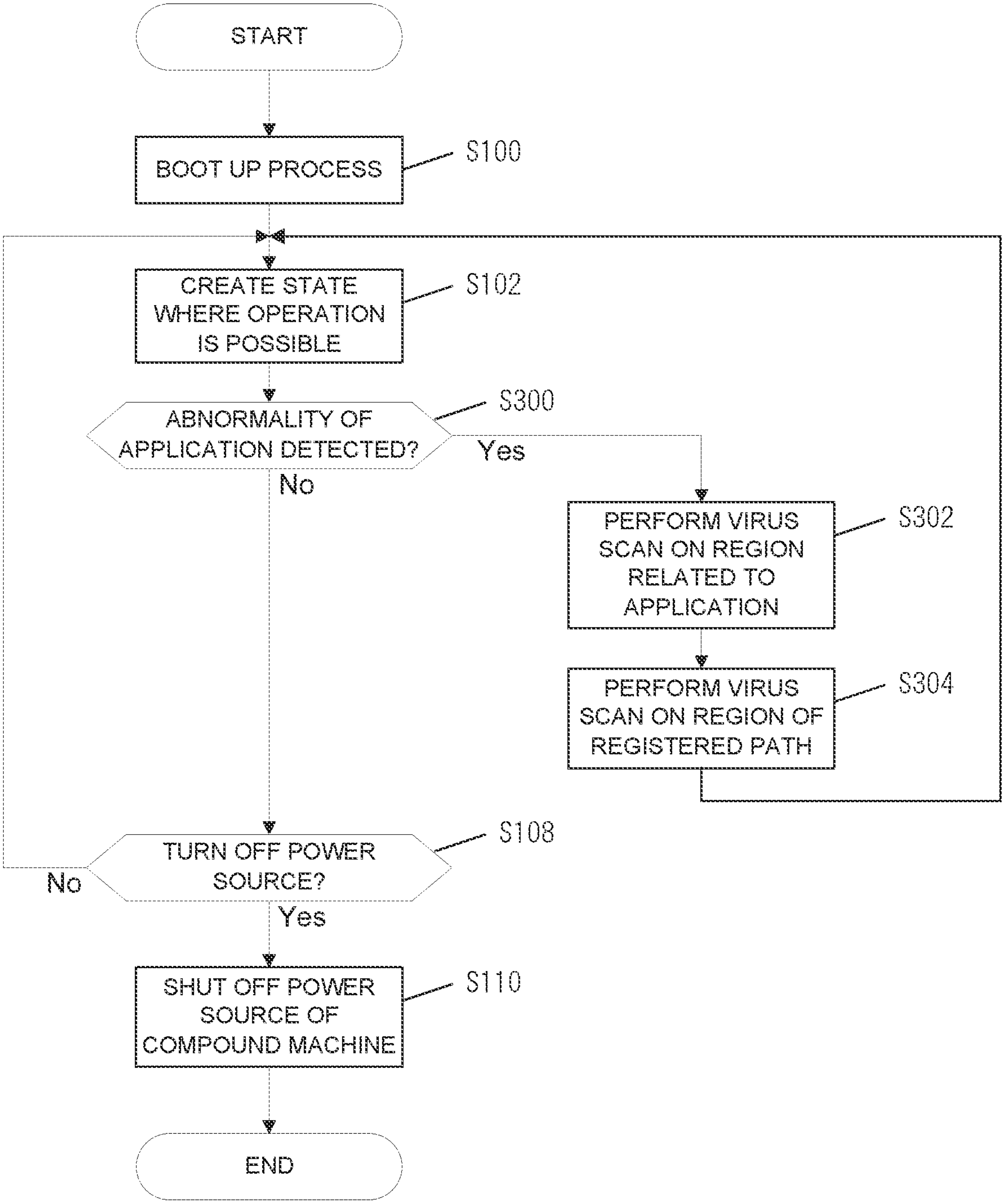
FIG. 13 is a flowchart illustrating a flow of main processing in the third embodiment.

Referring to FIG. 13, main processing performed by the compound machine 14 in the present embodiment is described. In the present embodiment, after a state where operation is possible is created, the controller 100 (the abnormality detection unit 110) determines whether an abnormality of an application has been detected (step S300). If determining that an abnormality of an application has not been detected, the controller 100 performs the process in step S108 (No in step S300→step S108).

If determining that an abnormality of an application has been detected, the controller 100 (the quarantine processing unit 106) performs the virus scan on a region related to the application (Yes in step S300→step S302). The region related to the application refers to any of the following regions.

(1) The application region 1624 in the system region 162.

(2) The application-specific data region 164.

(3) The application region 1686 in the data region 168.

Further, the controller 100 (the quarantine processing unit 106) refers to the setting table 172 so as to perform the virus scan on a region indicated by the registered path of an added scanning target (step S304).

After a process in step S304 is performed, the processing by the controller 100 returns to step S102. The quarantine processing unit 106 may be made to perform the virus scan on all the regions in the storage 160 if a virus has been found in step S302 or S304.

As described above, the compound machine 14 in the present embodiment performs the virus scan on a virus scanning target (application region) if the execution of an abnormal (unexpected) application or an abnormal quit of an application has been detected with the "mandatory access control" (whitelist) function. The compound machine 14 in the present embodiment also performs the virus scan on a storage region of a path registered in setting of the "mandatory access control" (whitelist) function. Thus, even if an abnormality related to an application has been detected, the compound machine 14 in the present embodiment is put into a secure state by performing the virus scan on an appropriate region.

4. Fourth Embodiment

Next, a fourth embodiment is described. Similarly to the third embodiment, the fourth embodiment is an embodiment where, if an abnormality has been detected in a compound machine, the virus scan is performed on an appropriate region according to the detected abnormality. In the description below, it is assumed that a compound machine in the present embodiment detects damage to firmware as an abnormality of the compound machine. For the present embodiment, FIG. 13 in the third embodiment is replaced by FIG. 14. The identical processes are given the identical reference signs, and the description on such processes is omitted.

4.1 Functional Configuration

A compound machine 14 in the present embodiment has the same configuration as the configuration illustrated in FIG. 11 in the third embodiment. An abnormality detection unit 110 in the present embodiment detects an abnormality of firmware of the compound machine 14 (such as damage to the firmware).

4.2 Flow of Processing

Figure 14:
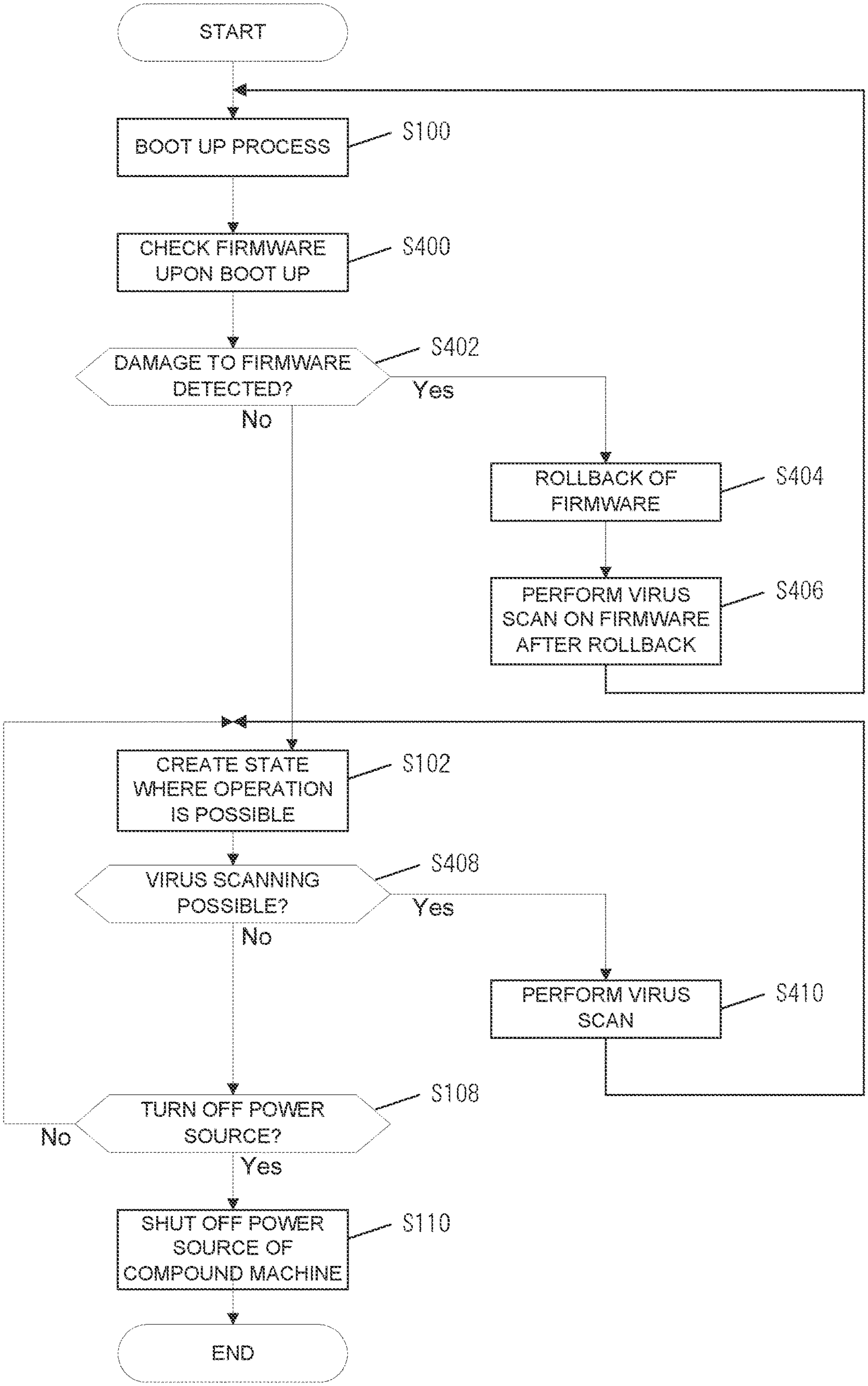
FIG. 14 is a flowchart illustrating a flow of main processing in a fourth embodiment.

Referring to FIG. 14, main processing performed by the compound machine 14 in the present embodiment is described. In the present embodiment, after the process in step S100 is performed, the controller 100 (the abnormality detection unit 110) conducts a firmware check at the time of boot up (step S400). For instance, the abnormality detection unit 110 checks whether firmware stored in the firmware region 1622 is an appropriate firmware and, if the stored firmware is not an appropriate firmware, attempts to detect damage to the firmware.

Next, the controller 100 (the abnormality detection unit 110) determines whether the damage to the firmware has been detected by the firmware check (step S402).

If determining that the damage to the firmware has been detected, the controller 100 makes the basic functions of the compound machine 14 unavailable and carries out rollback (reinstallation) of firmware (Yes in step S402→step S404). For instance, the controller 100 acquires firmware from a device where the firmware is stored or acquires firmware that was previously stored in the storage 160 as a backup, so as to store the acquired firmware in the firmware region 1622.

At this time, the controller 100 (the quarantine processing unit 106) performs the virus scan on the firmware obtained by the rollback (step S406). In other words, the quarantine processing unit 106 performs the virus scan on the firmware itself, which is to be installed. The quarantine processing unit 106 may perform the virus scan on the firmware region 1622, in which the firmware is stored in step S404.

After a process in step S406 is performed, the processing by the controller 100 returns to step S100. If a virus has been detected in step S406, the controller 100 may interrupt the processing illustrated in FIG. 14 and notify that a virus has been detected in the firmware obtained by the rollback. For instance, the controller 100 displays a message stating that a virus has been detected in the firmware obtained by the rollback on the display section 140 or sends an electronic mail containing such message to a specified user (a manager of the compound machine 14, for instance).

If determining in step S402 that the damage to the firmware has not been detected, the controller 100 performs a process in step S102 (No in step S402→step S102). Then, if virus scanning is possible, the controller 100 (the quarantine processing unit 106) performs the virus scan (Yes in step S408→step S410). With respect to the virus scan in step S410, the quarantine processing unit 106 may omit the virus scan on the firmware region 1622. If virus scanning is not possible, the controller 100 performs the process in step S108 (No in step S408→step S108).

The controller 100 performs the processing illustrated in FIG. 14 so as to perform the virus scan not on all the regions in the storage 160 but on the firmware itself if the damage to the firmware is detected.

If the virus scan is performed on all the regions in the storage 160 when the damage to the firmware is detected, there is the danger that a damaged state of the firmware may be worsened, or a long time elapses before the restoration of the firmware, which may increase the danger. Consequently, if the firmware is damaged, it is important to restore the firmware, so that it is important to confirm by checking that the firmware to be installed for restoration has no problems with condition. The controller 100 in the present embodiment only performs the virus scan on the firmware to be installed for restoration if the damage to the firmware has been detected, so as to confirm in a short time that the firmware to be installed for restoration has no problems with condition, which makes it possible to reduce time elapsing before the restoration of the firmware.

The controller 100 (the quarantine processing unit 106) may perform the virus scan on all the regions in the storage 160 after installation of the firmware. As an example, if the damage to the firmware has not been detected in step S402 after the reinstallation of the firmware, the quarantine processing unit 106 performs the virus scan on all the regions in the storage 160 before the process in step S102 is performed.

As described above, if the damage to the firmware has been detected, the compound machine 14 in the present embodiment carries out the rollback of the firmware, and performs the virus scan on the firmware, which is at least an influenced region (data). As a result, the time elapsing before the restoration of the firmware is reduced. The compound machine 14 in the present embodiment performs the virus scan on all the regions in the storage 160 after the restoration of the firmware so as to reach a securer state.

5. Modifications

The present disclosure is not limited to any of the embodiments as above, and various changes are possible. In other words, an embodiment that is obtained by combining technical means appropriately changed without departing from the gist of the present disclosure falls within a technical scope of the present disclosure.

For convenience of description, the above embodiments are sometimes described individually, while it is a matter of course that a combination can be made within a technically possible range. For instance, the first embodiment and the fourth embodiment may be combined with each other. Such combination makes the compound machine capable of performing the virus scan not only based on the settings but when a change in setting concerning security has been made and when an abnormality of the firmware has been detected.

The programs, which are to run in the respective apparatuses in the above embodiments, are each a program for controlling the CPU or the like (program for causing a computer to function) so that the above functions of the relevant embodiment may be realized. The information, which is to be dealt with in the apparatuses, is temporarily accumulated in a transitory storage (RAM, for instance) during the processing of the information, then stored in various storages such as a read-only memory (ROM) and an HDD, and read by the CPU as required so as to correct and write the information.

The recording medium, which is used to store the programs, may be any of a semiconductor medium (such as a ROM and a non-volatile memory card), optical and magneto-optical recording media (such as a digital versatile disc (DVD), a magneto-optical disc (MO), a mini disc (MD), a compact disc (CD), and a Blu-ray (registered trademark) disc (BD)), and a magnetic recording medium (such as a magnetic tape and a flexible disk). The loaded programs are executed to realize the above functions of the embodiments and, on a certain occasion, processing performed in cooperation with the operating system or another application program based on instructions from the programs realizes a function of the present disclosure.

If distributed on the market, the programs can be stored in a portable recording medium and as such distributed, or transferred to a server computer connected through a network such as the Internet. In the latter case, it is a matter of course that a storage of the server computer is incorporated into the present disclosure.

What is claimed is:

1. An image forming apparatus comprising:
one or more processors that perform a setting of a system on a system setting screen; and
an image former that forms an image according to the setting,
wherein the one or more processors perform security setting on the system setting screen, including setting of effectiveness or ineffectiveness of a quarantine against a virus,
responsive to determining that the quarantine against the virus being set as ineffective, a display for performing a setting regarding an execution of the quarantine against the virus is made ineffective, and
the one or more processors perform the quarantine against the virus in all regions of a storage where the quarantine against the virus is implementable as part of the security setting responsive to determining that the quarantine against the virus, which is included in the security setting on the system setting screen, is changed from ineffectiveness to effectiveness.

2. The image forming apparatus according to claim 1, wherein, in response to determining that the quarantine against the virus is set as effective and a security setting related to a region has been changed, the one or more processors implement the quarantine against the virus with respect to the region regarding a content of the changed security setting.

3. The image forming apparatus according to claim 2, wherein the one or more processors take, as a target for the quarantine against the virus, the region regarding the content of the changed security setting in addition to another region taken as the target for the quarantine against the virus that was previously scheduled.

4. The image forming apparatus according to claim 1,
wherein the one or more processors implement another setting as to a function to automatically delete an image as an input, and
wherein, in response to determining that the image, which is capable of being automatically deleted, has not been deleted, the one or more processors implement the quarantine against the virus, with respect to the image, at a time corresponding to performing the setting of the system.

5. The image forming apparatus according to claim 4, wherein the one or more processors implement the quarantine against the virus with respect to the image in response to that a job based on the image is performed.

6. The image forming apparatus according to claim 1,
wherein the one or more processors detect an abnormality including an execution of an application the execution of which is not permitted and an abnormal quit of an application, and
wherein, in response to determining that the abnormality has been detected, the one or more processors implement the quarantine against the virus with respect to a region where an application related to the abnormality is stored.

7. The image forming apparatus according to claim 1,
wherein the one or more processors detect a damage to firmware upon a boot up, and
wherein, in response to determining that the damage has been detected, the one or more processors implement the quarantine against the virus with respect to firmware to be reinstalled.

8. The image forming apparatus according to claim 1, wherein the regions have a system region, a spool region, and a data region, and the one or more processors implement the quarantine against the virus with respect to the data region and the spool region among the regions in response to determining that a setting regarding a function to perform input/output of data with an external device has been changed.

9. The image forming apparatus according to claim 8, wherein the setting regarding the function to perform input/output of data with the external device is a setting regarding HyperText Transfer Protocol Secure (HTTPS) or File Transfer Protocol Secure (FTPS).

10. The image forming apparatus according to claim 8, wherein the one or more processors further implement the quarantine against the virus with respect to the system region among the regions in response to determining that a setting regarding a function to perform input/output of data by the system of the image forming apparatus has been changed.

11. The image forming apparatus according to claim 10, wherein the setting regarding the function to perform input/output of data by the system of the image forming apparatus is a setting regarding Simple Mail Transfer Protocol-Secure Sockets Layer (SMTP-SSL), Lightweight Directory Access Protocol-SSL (LDAP-SSL), or syslog-SSL.

12. The image forming apparatus according to claim 1, wherein the one or more processors:

set a time and a day scheduled for implementing the quarantine against the virus as the part of the security setting, and implement the quarantine against the virus with respect to a region regarding a content of the security setting in response to determining that the scheduled time and day have come.

13. The image forming apparatus according to claim 1, wherein the one or more processors are capable of setting a time and a day for implementing the quarantine against the virus on the system setting screen.

14. The image forming apparatus according to claim 1, wherein the one or more processors are capable of instructing an immediate implementation of the quarantine against the virus on the system setting screen.

15. A control method for an apparatus including an image former and one or more processors to perform a process for a quarantine against a virus, the control method comprising:

implementing a setting of a system on a system setting screen;

forming, by the image former, an image according to the setting of the system;

performing security setting on the system setting screen, including setting of effectiveness or ineffectiveness of the quarantine against the virus, wherein, responsive to determining that the quarantine against the virus being set to ineffectiveness, a display for performing a setting regarding an execution of the quarantine against the virus is made ineffective; and performing the quarantine against the virus in all regions of a storage where the quarantine against the virus is implementable as part of the security setting responsive to determining that the quarantine against the virus, which is included in the security setting on the system setting screen, is changed from ineffectiveness to effectiveness.

* * * * *